United States Patent

[11] 3,581,183

| [72] | Inventors | Gian-Franco Piazza;<br>Rudolf Streit, both of Solothurn,<br>Switzerland; Martin Ulrich, Frankfurt am<br>Main; Werner Laber, Mainflingen; Adolf<br>Burkert; Manfred Tron, Walldorf;<br>Wolfgang Waluga, Frankfurt am Main all<br>of, Germany |
|---|---|---|
| [21] | Appl. No. | 7,686 |
| [22] | Filed | Feb. 2, 1970 |
| [45] | Patented | May 25, 1971 |
| [73] | Assignee | Autophon Aktiengesellschaft<br>Solothurn, Switzerland |

[54] CHARACTER INDICATOR WITH MEANS FOR MONITORING THE CORRECT POSITIONING
27 Claims, 9 Drawing Figs.

[52] U.S. Cl. .................................................. 318/696, 318/653
[51] Int. Cl. ...................................................... H02k 37/00
[50] Field of Search ....................................... 318/138, 254, 676, 32, 685, 696, 650, 651, 653

[56] References Cited
UNITED STATES PATENTS

| 3,209,586 | 10/1965 | Tohyama .................. | 318/32X |
| 3,346,792 | 10/1967 | Noumi ..................... | 318/138 |
| 3,412,393 | 11/1968 | Watkins .................... | 310/49 |
| 3,457,481 | 7/1969 | Riley ....................... | 318/32 |

*Primary Examiner*—G. R. Simmons
*Attorney*—Stevens, Davis, Miller & Mosher

ABSTRACT: A character indicator system for sequentially displaying data and having means to monitor the characters indicated to thereby determine the correctness of the display. The character carriers are advanced by a step-by-step motor which advances one step for each alternation of the input energy. The monitor means, as a function of the position of the character carrier or the motor armature, affects at least one alternating current signal whose frequency lies within the order of magnitude of several times the frequency of the energy used for driving the motor. Switch means feed the alternating current signal to the motor input where it can be picked up at the other end of the input and used for monitoring purposes.

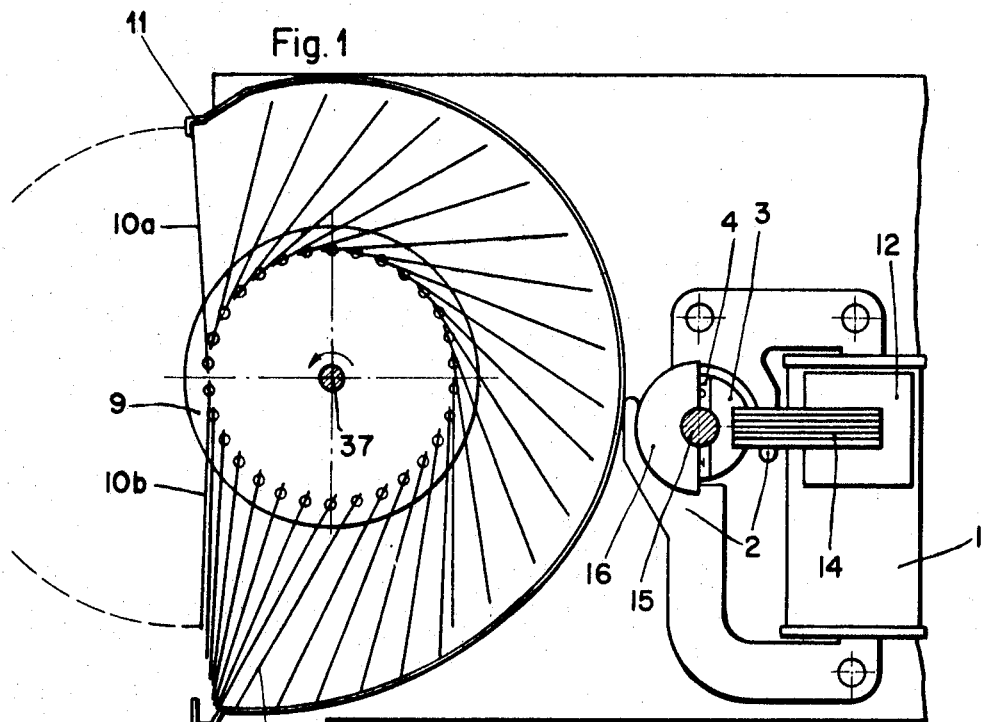
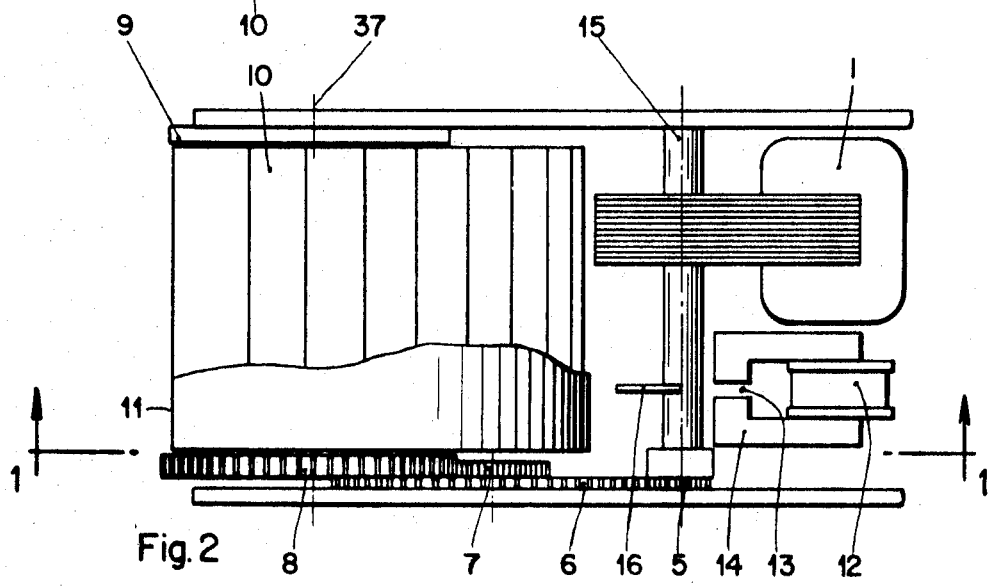

CHARACTER INDICATOR WITH MEANS FOR MONITORING THE CORRECT POSITIONING

There are known indicating systems which have indicator boards composed of character indicators each having a mechanically movable character carrier. Such a character carrier on whose position the character or group of characters indicated by the character indicator depends can, for example, be a drum on the circumference of which there are fastened boards which can be turned in the manner of the leaves of a book. The drum is preferably driven by a step-by-step motor, via a transmission, of such a nature that upon each step of the motor, the drum is rotated to such an extent that one board is turned over and thus a new character is shown. The alternately polarized pulses necessary for the movement of the step-by-step motor are, in this connection, produced in a control device and counter, and the character indicators of a system are connected in groups with said control device and thus set by said device.

There is now the need to monitor the characters indicated by the character indicator, since it must always be expected that the character carriers may become stuck or carry out a number of steps smaller than the corresponding number of pulses imparted to the step-by-step motor. Stuck character carriers can, to be sure, be recognized generally without any great difficulty upon viewing the indicator board formed of the character indicators, since they remain stationary, while the character carriers in their vicinity move; on the other hand, other errors can be recognized only by an exact comparison of the indications with what their correct value should be, which, in the case of large systems with constantly varying indications, means a large amount of work. In many cases, this monitoring can furthermore only be carried out with difficulty, since the data to be indicated are not held together in coherent form. The monitoring task is frequently made further more difficult by synchronization devices which attempt, by mechanical interlock and release means, to bring the incorrectly set character carrier back into the correct position upon the next actuation, so that mistakes which only occur periodically cannot be recognized at all.

To be sure, there are known indicating systems in which the frequency of oscillatory circuits is affected as a function of the position of the character carriers by capacitive or inductive means, in connection with which, by monitoring the frequency of the signals produced by means of these oscillatory circuits, the position of the character indicators can be monitored. In these known systems, however, several special lines are required between the character indicator and the control device for this supervision and return report, so that a large equipment expenditure is necessary in the case of large indicator boards. The purpose of the present invention is to develop the character indicators of an indicator board of the type described in such a manner that a return report and supervision is possible without the provision of additional connecting lines extending between the character indicators and the control device and without the use of special connecting means for this monitoring.

The present invention relates to a character indicator having a character carrier which is driven by a motor supplied with energy via a feed line. This character indicator contains means which, as a function of the position of the character carrier, affect at least one alternating current signal whose frequency lies within the order of magnitude of several times the frequency of the energy used for the driving of the motor. This character carrier is characterized by switch means which feed this alternating current signal into the feed line, so that the alternating current signal is picked up at the other end thereof at which the drive energy for the motor is fed and can be used for monitoring.

The means for accomplishing the foregoing objects and other advantages, which will be apparent to those skilled in the art, are set forth in the following specification and claims, and are illustrated in the accompanying drawings dealing with several embodiments of the present invention. Reference is made now to the drawings in which:

FIGS. 1 and 2 are partial schematic presentations of a first embodiment of a character indicator with a drum driven from a step-by-step motor via a transmission, on the circumference of which drum sheets indicating characters are arranged. This character indicator contains means by which the position of the motor shaft can be monitored. FIG. 1 shows a section view taken along line 1–1 of FIG. 2, while FIG. 2 is a plan view. In both the figures, individual parts have been cut away in order to permit important devices to be seen.

Figure 3:
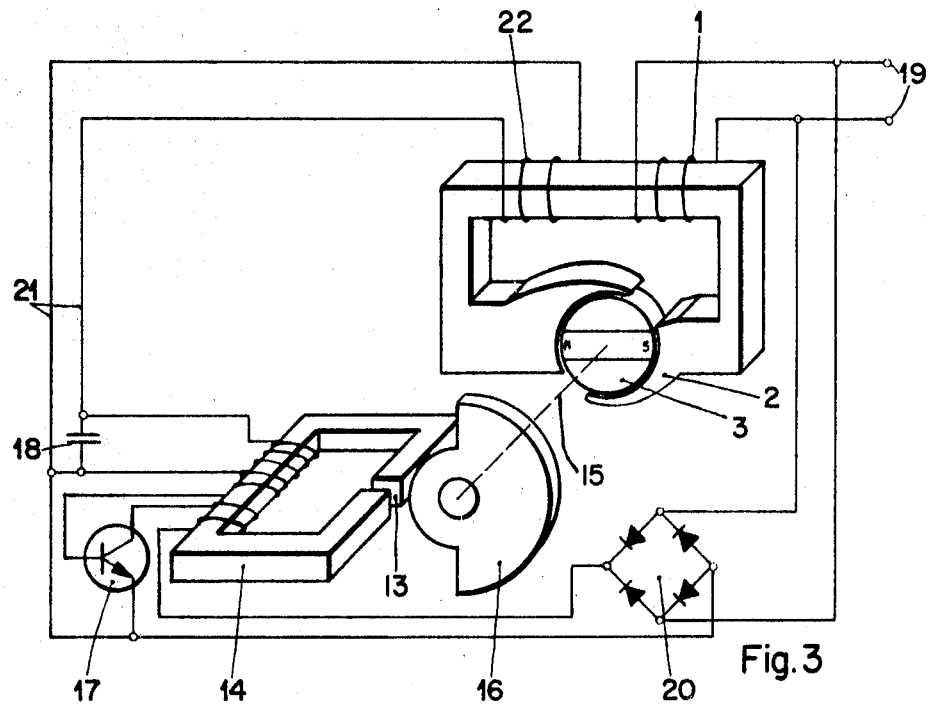
FIGS. 3, 4 and 5 show schematically those parts necessary for the monitoring of a number of other variants of character indicators with means for monitoring the position of the motor shaft.

The character indicator shown in FIGS. 1 and 2 contains a drum 9 which has on its circumference an even number of sheets 10, each supported for rotation around a pin. Upon the rotation of the drum in the direction indicated by the arrow, these sheets rise upward on the inner side of the character indicator, strike against the retaining angle 11 and drop downward, as indicated by the dashed line, whereupon the cycle starts all over again. The upstanding sheet 10d, which is present behind the retaining edge, and the frontmost downward hanging sheet 10b together exhibit a character. The drum is driven by a step-by-step motor which comprises a coil 1, two yokes 2 and an armature 3 with a permanent magnet 4 contained therein. On the shaft of the armature there is fixed a gear 5 which engages a gear 6 which is, in its turn, coupled to another gear 7. This gear 7 meshes with a gear 8 which in its turn is fixed on the shaft 37 of the drum 9. The transmission ratios are now so selected that upon every half a revolution of the armature 3, the drum 9 is turned to such an extent that one sheet drops down and a new character is thus indicated.

The step-by-step motor has, in a known manner, two stable positions. If a voltage of a given polarity is applied to its coil, it assumes a given one of these two positions, so that one of the two positions is associated with each polarity. For the advancing of the motor and thus of the drum 9, pulses of alternating polarity must thus be applied to the coil of the step-by-step motor. As a result of the transmission ratio selected between the step-by-step motor and the drum, a new character is thus indicated for each change in polarity.

The switch means for permitting the monitoring of the correct position of the character indicator comprise a coil 12 having a C-shaped core 14 which has an air gap 13. On the shaft 15 of the step-by-step motor there is fixed a semicircular plate 16 which in the one stable position of the armature is located within the air gap, while in the other stable position (as shown in FIGS. 1 and 2), it is completely outside the air gap.

In FIG. 3, there are shown schematically the parts contained in the character indicator for FIGS. 1 and 2 which serve for the driving thereof and make possible a monitoring of its manner of operation. On the coil core 14 there are arranged two windings of an alternating current generator which furthermore comprises the transistor 17 and the capacitor 18. This generator is of conventional construction but could also be wired in some other manner. The frequency of the signal produced by it lies in the order of magnitude of a multiple of the pulse frequency driving the motor, and preferably is in the audio frequency range. The output of the generator now leads via the lines 21 to the auxiliary winding 22 of the motor, whereby the signal produced by the generator is transmitted inductively to the main winding 1 and thus to the input 19. The generator is fed via the same input 19 as that over which the motor is fed with the pulses for the stepping thereof. This is effected by means of the full-wave rectifier 20 which is connected in parallel to the motor winding 1 to the input 19 and thus always feeds the generator when stepping pulses are fed to the step-by-step motor.

The signal given off by the generator is influenced by the position of the plate 16. This influence may be of two different kinds. If a plate of magnetic material which is a poor conductor of electricity is used, the inductance of the coil is changed by the movement thereof into the air gap, as a result of which the frequency given off by the generator assumes a different value. On the other hand, if a plate of nonmagnetic material which is a good conductor of electricity is used, then upon the movement thereof into the air gap 13, the losses of the coil are changed, as a result of which the amplitude of the signal changes. In the extreme case, which is, however, the most important one in actual practice, the conditions are so selected that when the plate is within the air gap, the generator can no longer oscillate.

Each condition of the generator thus corresponds to one of the two stable conditions of the armature and thus to the polarity of the last pulse imparted to the step-by-step motor. On basis of the changes in frequency and amplitude of the alternating current signals transmitted via the input 19 to the control device (not shown), it is indirectly possible for the control device, by continuous monitoring of the movement of the motor, to monitor the position of the character carrier. This possibility is present if, at the end of each stepping pulse applied to the motor, it is determined whether the alternating current signal received corresponds to the polarity of the corresponding pulse. The same purpose can also be achieved by the comparison of the number of pulses imparted to the motor and the change of the signal produced by the generator. The devices associated with the control device which are necessary for this monitoring can be developed readily of generally known circuit means and need therefore not be described, since they are not directly related to the invention.

Figure 4:
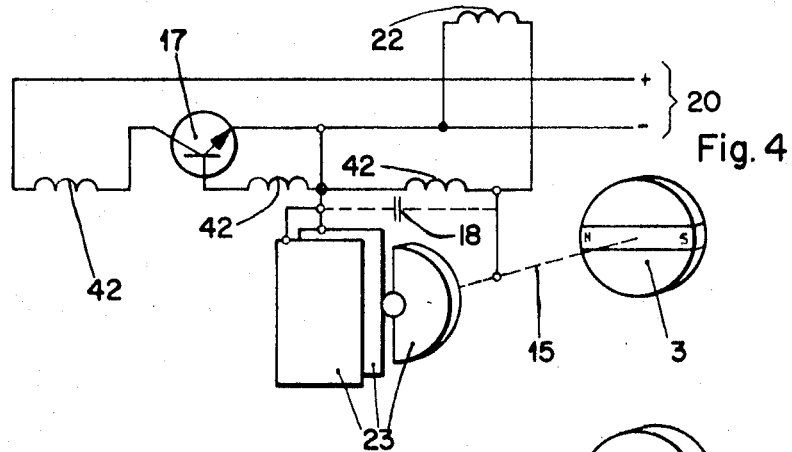

FIG. 4 is a schematic showing of another variant of a character indicator the parts of which are connected with the production of an alternating current signal and with the change thereof. This character indicator contains an alternating current generator having windings 42 of constant inductance and a capacitor 18 of fixed capacitance. A variable capacitor 23 is connected in parallel to the capacitor with the moving part of the variable capacitor being connected with the armature 3, so that the frequency of the generator is changed with the rotation of the armature. There are thus conditions similar to those which are present in the example described above. The variable capacitor 23 need, of course, not be connected in parallel to a fixed capacitance; it can also be provided as the sole frequency-determining capacitance.

Figure 5:
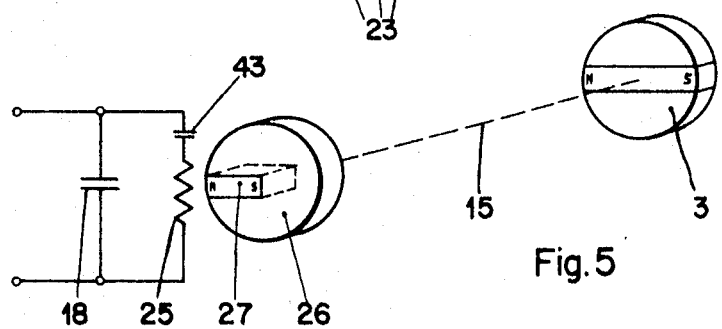

In FIG. 5, in which parts of a variant of the arrangements in accordance with FIGS. 3 and 4 are shown, a resistor (field plate) 25, which is dependent on the magnetic field, and the capacitor 43 are connected in parallel to the capacitor 18. The resistance 25 which is dependent on the magnetic field has, as is known, the property that its resistance increases substantially when it has a magnetic field passing therethrough. On the shaft 15 of the armature 3 there is fixed a disc 26 of nonmagnetic material, in one portion of which a permanent magnet 27 is inserted. The position of this magnet within the disc 26 is now so related to the stable positions of the armature 3 that in one of these stable positions the magnet 27 is opposite the field plate resistor 25. By the increase in the resistance of the resistor 25, which is dependent on the magnetic field now present, the action of the capacitor is substantially reduced, so that the frequency of the generator increases. In order to amplify the magnetic field acting on the field plate resistor 25, it is naturally advisable to provide a path for the magnetic return, which, however, has been omitted from the figure for reasons of simplicity. It is also possible to insert the resistance which is dependent on the magnetic field into the circuit in such a manner that if this resistance is increased by a magnetic field, the oscillations of the generator terminate or can only then start.

Figure 6:
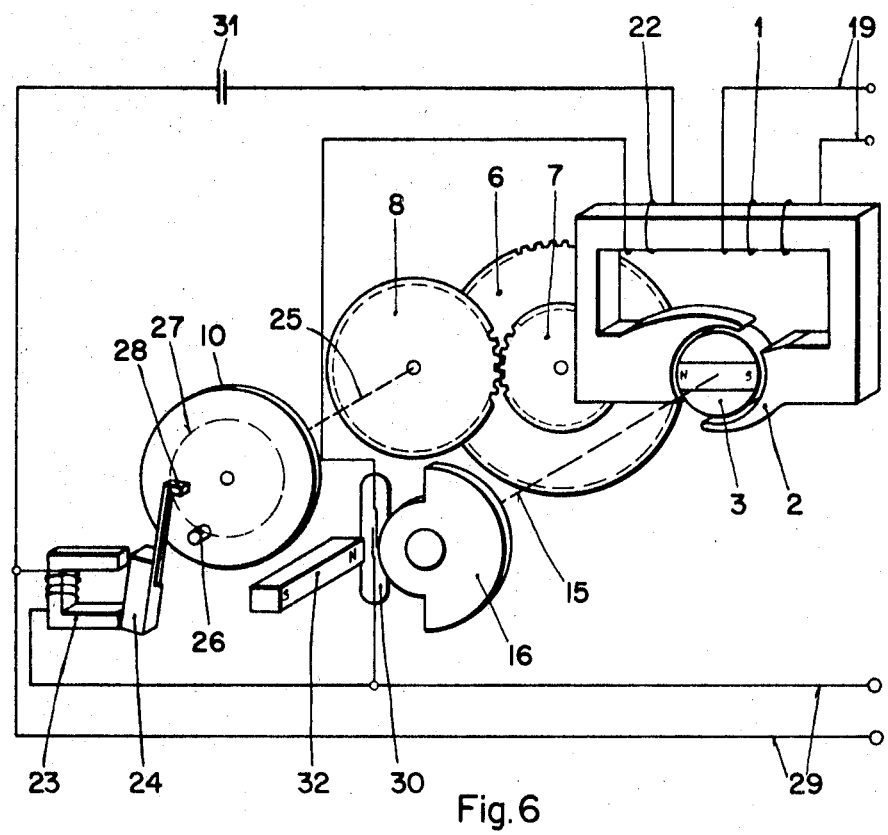
FIG. 6 shows schematically the parts necessary for an understanding of the invention of a character indicator with a synchronizing device and means for return-report of the position of the motor shaft.

FIG. 6 is a schematic showing of a character indicator in connection with which the signal given off via the input 19 of the motor to the control device is not produced by a generator contained in the character indicator but is fed from the outside via another input 29. The character indicator shown has, in addition to the step-by-step motor and the parts which are designated in the same manner as in FIGS. 1—3, a synchronizing device. This device serves to stop the character carrier in a given position, the synchronization position, so that in this way it can be brought from any position first of all into this synchronization position from where it can be brought into a given position by a counted number of pulses fed to its motor. Such a synchronization device is, in general, also necessary in the case of a character indicator in accordance with FIGS. 1-—3, but has been omitted there since knowledge thereof is not necessary for an understanding of the manner of operation of the devices described in connection with those figures. The synchronization device shown in FIG. 6 has an electromagnet 23 with an armature 24. On the drum 10 (only one end of which has been shown), there is mounted a pin 26. An angle member 28 fastened to the armature 24 extends into the path 27 of pin 26. If the drum is now driven by a motor via the transmission consisting of the gears 6, 7 and 8, it is prevented from turning further when the pin 26 strikes the angle member 28, and therefore remains in this synchronization position regardless of further pulses imparted to the step-by-step motor. The further rotation of the drum is only then possible when, simultaneously with the arrival of a stepping pulse of the correct polarity at the input 19, the electromagnet 23 is energized via the input 29 and thus the pin 26 is released.

The input 29, which is necessary for feeding DC pulses to excite the magnet 23, is in this case used also for transmission of an AC signal the frequency of which is a multiple of the pulse frequency necessary for the stepping of the motor. This AC voltage, which is applied to the input 29 by the control device at least during the setting of the character indicator, cannot flow through the coil 23 as a result of its inductance. Via the protective tube contact 30 and the capacitor 31, the input 29 is connected, in a connection which is passable only by alternating current, with the auxiliary winding 22 of the step-by-step motor.

If the protective tube contact 30 is closed, the alternating voltage applied to the input 29 is fed to this auxiliary winding 22 and induces a voltage in the drive winding of the motor which voltage passes via the input 19 back to the control device (not shown). By the opening and closing of the protective tube contact 30, the alternating voltage present on the input 19 is thus modulated in amplitude. Instead of an inductive transmission of the alternating current signal from the input 29 to the input 19, a capacitive transmission could, of course, be also used.

The protective tube contact 30 is controlled by a permanent magnet 32 which is stationary. As a result of the action of the semicircular plate 16 fastened to the motor shaft 15, the action of the magnet 32 on the contact is, however, dependent on the position of the motor shaft 15. In the one stable position of the motor armature, the plate 16 is between the magnet 32 and the protective tube contact 30, so that the magnet cannot act on the contact and the latter is therefore opened. In the other stable position of the armature, when the plate 16 does not prevent the magnetic action, the contact is closed. On the basis of the presence or absence of alternating voltage at the input 19, it can be determined by the control device which position the armature 3 of the motor is in.

Figure 7:
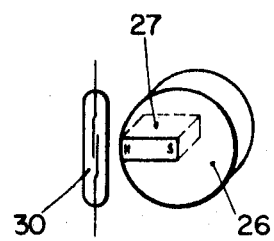
FIG. 7 shows, like FIGS. 3, 4 and 5, another variant for the monitoring of the position of the motor shaft, which variant can be used in character indicators in accordance with FIGS. 1, 3 or 6.

In a character indicator to which the alternating voltage is fed via a line in accordance with FIG. 6, this voltage can also be applied to the input 19 in various manners other than that described and removed from it. FIG. 7 shows an example of a means for connecting and disconnecting the protective tube contact 30 by a disc 26 of nonmagnetic material, which disc corresponds to the disc shown in FIG. 5 and a permanent magnet 27. If the magnet 27 is in the position shown in the drawing, it acts on the protective tube contact 30 to close the contact. In the other position of the motor armature and thus of the disc 26, the contact will be opened.

In the previous embodiments, a two-pole step-by-step motor has in all cases been shown. However, it is clear that the invention can be employed also when using step-by-step motors having more than two poles. The transmission ratios in this case, as in the case of the two-pole motors, are also so selected that the indication of a new character corresponds to each step of the motor which is carried out by a change in polarity of the current in the coil thereof. If such a motor having more than two poles is used, then either the number of vanes of the screening plate 16 (FIGS. 1, 2, 3 or 6) or the number of permanent magnets on disc 26 (FIGS. 5 or 7) must be set at a value which corresponds to one-half of the number of poles of the motor. Instead of a disc having a plurality of permanent magnets, one can, in the last mentioned case, also employ a star-shaped permanent magnet or a disc-shaped one consisting completely of magnetizable material with poles magnetized thereon. A variable capacitor in accordance with FIG. 4 can also be adapted by suitable shaping to step-by-step motors having more than two poles.

The return-report devices described up to now serve merely for the reporting back of the positions of the step-by-step motor. As already pointed out, in this way the position of the character carrier can be derived only indirectly from the monitoring of the movement of the motor. The invention can also serve to report any position of the character indicator directly to the control device without it being necessary to monitor the path over which this position has been reached. The devices serving for the monitoring must then no longer report back the position of the motor shaft 15, but rather that of the shaft 37 of the character carrier drum, for which purpose there is best suited a device built upon basis of a binary code. In this connection, different frequencies are advantageously used for transmitting the different places of the code characters.

Every transmission criterion corresponding to a binary place can, in principle, be produced and acted on in the same manner as the return-report devices already described which are also based on a binary principle. The frequencies which are simultaneously necessary, which are ascribed to the different places, can in this case, also be produced either in a corresponding number by audio generators in each character indicator or be fed from the outside and merely switched in the character indicator. In the last mentioned case, the different frequencies can either be each fed to a separate line or, as in the case of the previously described examples, they can be fed over a single line, in which case, however, a filter is necessary for each frequency and character indicator.

Figure 8:
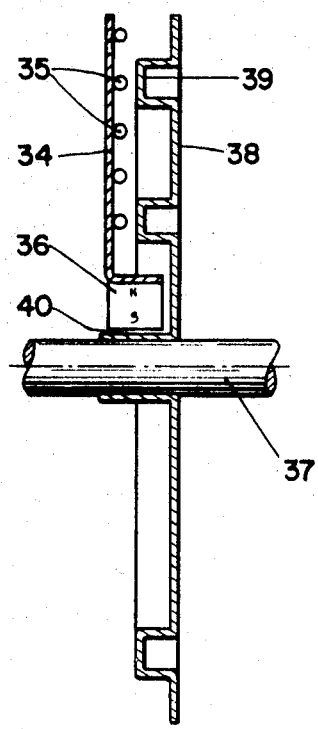
FIGS. 8 and 9 show a cross section and an elevation of a coding device of another illustrative embodiment, not shown in detail, in which the reporting back of the position of the drum is possible by 32 different alternating current signals.
Figure 9:
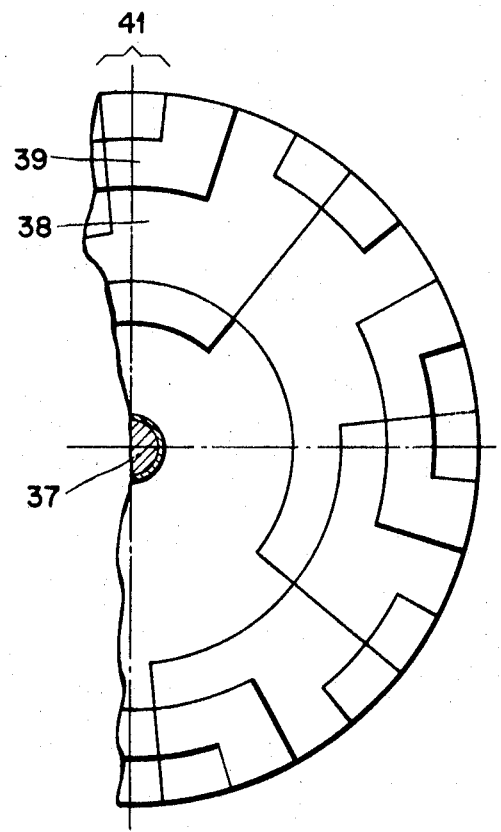

FIGS. 8 and 9 show, as part of an embodiment of such a return-report device, the corresponding coding device which is developed by means of resistors which are dependent on a magnetic field. On a fixed plate 34 of magnetic material, there are fastened five resistors 35 which are dependent on a magnetic field. A permanent magnet 36 is mounted on the lower end of plate 34 with its north pole contacting the plate. The south pole of the magnet faces the shaft 37 of the character carrier drum (not shown), the rotation of which is not impeded in view of the air gap 40. On the shaft 37 there is firmly fastened a code disc 38 of magnetic material which has projections 29 which are arranged in accordance with a binary code. The arrangement of the projections can be noted from FIG. 9. Since binary code discs for optical scanning in combination with analog-digital converters can be deemed generally known, a precise description thereof need not be given here.

Since, as already briefly mentioned, the plate 34 is connected with the north pole of the permanent magnet 36, and the code disc 38, via the air gap 40, is connected to the south pole of magnet 36, the magnetic circuit is closed between the code disc 38 and the plate 34. As a result of the action of the projections 39, the resistors 35 which are dependent on a magnetic field and which lie opposite the projections 39 are in a substantially stronger magnetic field than the other resistor 35. The corresponding resistances are accordingly varied from low resistance condition to a high resistance condition. The space taken up by the magnetic field dependent resistors in the direction of the movement of rotation is adapted to the corresponding smallest size of the projections, so that for each character indicated by the character indicator, a different combination of magnetic field dependent resistors is brought into the desired condition by, in each case, one opposite projection. Each of the resistors is inserted, in a manner not shown in the drawing, into the circuit of a separate alternating current generator, the characteristics of which are so dimensioned that it can only oscillate when the magnetic field dependent resistance associated with it is in a low-ohmic condition. The five generators produce frequencies which differ from each other and which are applied jointly to the input of the corresponding step-by-step motor. By the screening out of the different frequencies, it is then possible for the control device to clearly determine the combination sent and thus the position of the character indicator in question.

Instead of the connecting and disconnecting of the generators and instead of the use of resistors which are dependent on the magnetic field, all variants described for the transmission of the position of the motor can, as already stated, by applied in principle also for the binary coded transmission of the position of the character carrier.

Character indicators with means for the coded, unequivocal characterizing of the position of their character carriers, are to be sure, substantially more complicated than the embodiments first described but, on the other hand, have the advantage that a synchronization device can be dispensed with in their case. This in its turn leads to the result that the character indicators can be brought into position more rapidly, since it is merely necessary to impart pulses to each character indicator until its position corresponds to the desired position. This will be the case within at most a full revolution of the character carrier as compared with the two revolutions which character indicators set by means of a synchronization device must carry out.

In all embodiment there are used, for the feeding and transmitting of the control signals exclusively, lines which must be present in any event for the operation of the character indicator in question. Thus, aside from the connecting devices in any event necessary for the selective connecting of the character indicators to the control device, no additional devices of this kind are necessary, nor are any additional lines required. This may make it possible to introduce the inventive monitoring of the manner of operation of the character indicators in an existing machine by replacing the character indicators and by supplementing the control device, but without changing the rest of the installation. The examples described do not exhaust the possibilities for the use of the invention. In particular, control of the return-report signals by optical means is possible. The return-report signals need also not lie in the audio frequency range; the use of higher frequencies can afford advantages due to the simple filtration and the small number of switch elements necessary for this. The invention is also not limited to character indicators with sheets fastened to drums; there are also other known types of mechanically moved character indicators which are also suitable for the application of the invention.

The present invention therefore may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

What I claim is:

1. A character indicator system comprising a character carrier, means including a motor operatively connected to drive said character carrier, input means to supply energy to said motor, means which, as a function of the position of the character carrier, act on at least one alternating current signal whose frequency lies in the order of magnitude of a multiple of the frequency of the energy used for driving the motor, and switch means for feeding said alternating current signal to said input means so that the alternating signal can be taken out at the end remote from the motor, where the drive energy for said motor is fed, and can be used for monitoring.

2. A character indicator system according to claim 1, in which the motor, in addition to a main winding, also has an auxiliary winding to which the alternating current signal is fed and from which this alternating current signal is transmitted inductively to the main winding and thus to the input means.

3. A character indicator system according to claim 1, wherein said motor is a step-by-step motor the armature of which is advanced by means of alternately polarized pulses and has first and second stable positions which correspond in alternating sequence to separate positive and negative polarized pulses, stationary means, and means connected to an armature of the step-by-step motor which, together with said stationary means, fix the alternating current signal at one of two different values, one of which is associated with the first position of the step-by-step motor and the other with the second position.

4. A character indicator system according to claim 1, in which said switch means affect the amplitude of the alternating current signal.

5. A character indicator system according to claim 4, in which said switch means control said alternating current signal by means of a second input means feeding current to said switch means.

6. A character indicator system according to claim 5, further comprising means controlled by a locking magnet for locking and releasing the movement of the character carrier in given positions, a circuit including said locking magnet, said switch means, as a function of the position of the step-by-step motor, connecting said circuit with the input means for the step-by-step motor in a manner which is passable only by alternating current so that an alternating current signal fed said circuit is modulated in amplitude by the switch means and is fed to the input means of the step-by-step motor.

7. A character indicator system according to claim 1, further comprising at least one oscillation generator which produces said alternating current signal.

8. A character indicator system according to claim 7, in which the oscillation generator is fed from said input means via a full-wave rectifier.

9. A character indicator system according to claim 3 in which the switch means which controls the alternating current signal is responsive to a magnetic field.

10. A character indicator system according to claim 9, in which the magnetic field responsive switch means consists of at least one protective tube contact means the contacts of which open and close in response to the presence of a magnetic field.

11. A character indicator system according to claim 9, in which the magnetic field response switch means comprise at least one resistance the ohmic value of which is dependent on the presence and strength of a magnetic field.

12. A character indicator system according to claim 9, further comprising a permanent magnet fixedly mounted in the vicinity of the magnetic field responsive switch means, at least one plate fixedly connected to said character carrier drive means, which plate, in the one stable position of the motor armature, is positioned between the permanent magnet and the magnetic field responsive switch means and thereby prevents the action of the magnet on said switch means, while the plate in the other stable position of the armature is removed from between said permanent magnet and magnetic field responsive switch means and thus permits such action.

13. A character indicator system according to claim 12, wherein said plate is fixed to the armature of said motor.

14. A character indicator system according to claim 12, wherein said plate is made of magnetic material.

15. A character indicator system according to claim 9, further comprising at least one permanent magnet fixedly connected to said character carrier drive means and which in one stable position of the armature acts on said switch means, while in the other stable position of the armature no such action is present.

16. A character indicator system according to claim 4, in which said switch means, as a function of the position of the character carrier, applies a code-determined selection of several signals of different frequency to the input means.

17. A character indicator system according to claim 16, further comprising a plurality of oscillation generators operating on different frequencies, the signals of which are fed, as a function of the position of the character carrier, in a code-determined selection to the input means.

18. A character indicator system according to claim 7, in which said switch means act, as a function of the position of the character carrier, on the frequency produced by the generator.

19. A character indicator system according to claim 7, further comprising a coil having an air gap and contained in the generator, and at least one plate fixedly connected with the character carrier drive means and which in one stable position of the armature is positioned in said air gap, while in the other stable position of the armature it is out of said air gap.

20. A character indicator system according to claim 18, in which said magnetic responsive switch means and frequency-determining switch elements are selectively connected to and disconnected from the oscillation generator, whereby the frequency of said generator is influenced, and means which, in the region of said switch means, produce a magnetic field which is dependent on the position of the armature of the step-by-step motor.

21. A character indicator system according to claim 20, in which said magnetic field responsive switch means comprises a protective tube contact means the contacts of which are opened and closed in response to the presence of a magnetic field.

22. A character indicator system according to claim 20, in which said magnetic field responsive switch means consists of a resistance the ohmic value of which varies in response to the presence and strength of a magnetic field.

23. A character indicator system according to claim 20, further comprising a permanent magnet fixedly mounted in the vicinity of the magnetic-field responsive switch means and at least one plate of magnetic material fixedly connected to said character carrier drive means, which plate, in the one stable position of the motor's armature, is positioned between the permanent magnet and the magnetic-field responsive switch means and thereby prevents the action of the magnet on said switch means, while the plate in the other stable position of the armature is removed and thus permits such action.

24. A character indicator system according to claim 20, further comprising at least one permanent magnet fixedly connected to said character carrier drive means and in one stable position of the motor acts on the magnetic-field responsive switch means, while in the other stable position of the armature has no such action.

25. A character indicator system according to claim 18, further comprising a mechanically adjustable frequency-determining capacitor contained in the generator, the adjustable part of said capacitor being connected to the character indicator drive means whereby the capacitance of said capacitor is dependent on the position of the character carrier.

26. A character indicator system according to claim 18, further comprising a plurality of oscillation generators and means for varying the frequency thereof as a function of the position of the character carrier in accordance with a given code.

27. A character indicator system according to claim 1, in which said drive means further comprises transmission means operatively connecting said motor to drive said character carrier.